US006880236B2

(12) United States Patent
Apfelthaler

(10) Patent No.: US 6,880,236 B2
(45) Date of Patent: Apr. 19, 2005

(54) DEVICE AND METHOD FOR INSTALLING MUNTIN BARS INTO A FRAME

(75) Inventor: Harald Apfelthaler, Langenzenn (DE)

(73) Assignee: R & R Sondermashinen GmbH (DE)

( * ) Notice: Subject to any disclaimer, the term of this patent is extended or adjusted under 35 U.S.C. 154(b) by 118 days.

(21) Appl. No.: 09/865,665

(22) Filed: May 25, 2001

(65) Prior Publication Data

US 2002/0053173 A1 May 9, 2002

(30) Foreign Application Priority Data

Oct. 20, 2000 (DE) ........................................ 100 52 158

(51) Int. Cl.$^{7}$ ................................................ B23P 21/00

(52) U.S. Cl. ............................. 29/700; 29/798; 29/559; 29/407.1; 29/281.4; 29/281.5; 269/37

(58) Field of Search .......................... 29/428, 464, 468, 29/700, 712, 798, 525.11, 359, 469.09, 467.1, 709, 281.1, 281.3, 281.4, 281.5, 283; 52/956; 269/37, 71, 910

(56) References Cited

U.S. PATENT DOCUMENTS 3,448,976 A * 6/1969 Armstrong ................... 269/37
3,583,053 A * 6/1971 Hein ........................... 29/709
5,617,622 A * 4/1997 Anderson .................. 29/281.3
6,418,601 B1 * 7/2002 Olden et al. ............... 29/281.3

* cited by examiner

*Primary Examiner*—Jermie E. Cozart
(74) *Attorney, Agent, or Firm*—Gifford, Krass, Groh, Sprinkle, Anderson & Citkowski, P.C.

(57) ABSTRACT

A device for installing muntin bars into a frame of a window including a device for accurately positioning the muntin bars within the frame and also for providing an accurate junction between the bars and the frame. The device includes a mounting frame that is inclined with respect to the vertical plane, tie-bars movably supported by the mounting frame for fixing and machining spacer frames of different sizes together with respective muntin bars and an apparatus for arranging and fixing muntin bars within the spacer frame. A method is proposed by which a terminal plug is fixed within one end of a muntin bar. The plug is fixed by screws, clamps of similar type fasteners that are positioned in a program controlled manner using a screwing apparatus or a shooting device that is movably supported relative to the spacer frame.

32 Claims, 2 Drawing Sheets

DEVICE AND METHOD FOR INSTALLING MUNTIN BARS INTO A FRAME

FIELD OF THE INVENTION

The present invention relates to a device for installing muntin bars and in particular muntin gratings, i.e. a muntin cross, into a frame, i.e. a spacer frame of an insulated glass window. The present invention further relates to a method for making use of the device to fix muntin bars and in particular a muntin cross to a frame, i.e. a spacer frame of an insulated glass window.

BACKGROUND OF THE INVENTION

An installation of muntin bars and muntin gratings into spacer frames of insulated glass windows has been realized hitherto by means of manually operated mounting tables and platforms, onto which the spacer frames are to be fixed. Then, the muntin bar or the muntin grating is arranged and aligned within the frame by means of optical auxiliary lines or integrated measuring tapes. In the following step, the muntin bars or the muntin grating is manually fixed by using plug bodies made out of plastic material, which are to be arranged between the muntin bar ends or the muntin grating ends, and the inner side of the spacer frame, respectively. A muntin bar is herein plugged onto the plug body or has been plugged in advanced. Fixing of the muntin bars or the muntin gratings to the spacer frame is realized by a retaining clamps or nails, which are shot through the spacer frame by a pneumatically operated hammer, thereby anchoring the clamps or nails into the plug body. Another solution for fixing has been provided by means of screws. Accordingly, the plug body being provided with an outer flange is to be screwed together with or without a muntin bar at the inner side of the spacer frame at an appropriate site thereof. The fixing procedure of the muntin bar or the muntin grating must be accomplished on both sides. Afterwards the whole unit is to be manually turned around so the fixing method is to be repeated for the resting two sides of the spacer frame. In those cases in which it can not be guaranteed that the respective opposing sides of the spacer frame have the same length, the spacer frame including the muntin grating has to be turned around twice, namely one time around its longitudinal axis and one time around its lateral axis.

As a result, this method is very time consuming and expensive.

SUMMARY OF THE INVENTION

It is thus a primary object of the present invention to provide a method for installing a muntin, such as a muntin grating into a spacer frame of for example an insulated glass window, which method is simplified and thus less time consuming and less expensive.

It is another object of the present invention to provide the above method without performing a manual positioning and aligning action.

A still another object of the invention is to provide an above-described method according to which failures in positioning and aligning are prevented.

It is further an object of the present invention to provide a method according to the above kind that can be integrated in the manufacturing process of muntin bars or muntin gratings.

In accordance thereto, it is a main object of the present invention to provide a device incorporating the above-mentioned objects respecting the above method.

According to the latter main aspect of the invention, there is provided a device comprising a rectangular mounting frame having four frame pieces, which frame is inclined with respect to the vertical plane, and tie-bars movably supported by the frame for fixing and machining spacer frames of different sizes together with respective muntin bars, i.e. a respective muntin grating, and comprising an apparatus for arranging and fixing the muntin bars or the muntin grating in the spacer frame of for example an insulated glass window.

According to a second main aspect, there is provided a method using said device and including the steps of positioning the muntin bar or the muntin grating relative to the spacer frame, providing the muntin bar with a plug to be plugged into an end thereof, so that an ending flange of the plug abuts against an inner side of the spacer frame, and fixing the plug along with the respective muntin bar mounted thereto to the spacer frame, in that a screw or a shooting clamp is screwed or shot through the hollow space of the spacer frame profile from the outside thereof, which screw or shooting clamp is provided respectively, by a power screwing device or a pneumatically operated hammer which in turn is movably supported by the spacer frame.

In contradiction to a horizontal mounting table known in the art, the invention provides an inclined or angular positioned mounting frame that supports tie-bars aligned in the direction of the x-axis and the y-axis of said table, respectively, wherein at least one of the tie-bars can be moved or adjusted. By means of said arrangement a spacer frame having especially a rectangular shape can be coincidentally secured at its four corners to a muntin grating. Herein, all the movements of the required supports, clamps and adjusting devices and positioning devices for performing the positioning method can be realized using programmed intermittently actuated motors and/or pilot motors.

Due to this aspect the method can be integrated into an electronic controlled production of muntin bars, in which manufacturing process a determination of the dimension of muntins and their sectioning into these portions by use of a saw, as also the positioning process for the drilling device and the mounting process of said prepared muntins are performed by an electronic data processing.

In this way, both the source of errors being well known and caused due to a manual handling can be eliminated as well as the manufacturing time is shortened drastically. Further, by connecting the muntin bars or muntin gratings to the spacer frame by means of screws, the whole system is provided in a more robust manner, wherein the imperviousness of the frame is enhanced, too.

Further, producing a spacer frame provided with muntin bars or muntin gratings using the device according to the invention requires less space. Still further, according to the invention, economic advantages are involved.

According to preferred embodiments of the invention further beneficial structures can be gained.

The mounting frame can comprise two parallel, especially horizontally arranged fixed frame bodies and two parallel side bodies being arranged rectangular to the two frame bodies and connecting them together. The tie-bars in turn can comprise two upstanding tie-bar bodies which are at least partly movably supported by the frame bodies, and two transverse tie-bar bodies being rectangular to the upstanding tie-bar bodies and being adjustably supported by the side bodies.

The two transverse tie-bar bodies conveniently form an upper and a lower tie-bar, respectively, and are arranged above and beneath to the upstanding tie-bar bodies positioned rectangular thereto which form left-hand side and a right-hand side tie-bars, respectively.

The tie-bars can comprise positioning devices and centering devices, as for example sliding blocks and fixing devices, which enable a machining process for spacer frames having different sizes as also a machining process of said muntin bars or muntin gratings which are to be arranged within these frames.

Further, the tie-bar bodies can comprise a screwing apparatus and/or a pneumatically operated hammer being movably supported by the tie-bar bodies with respect to the spacer frame and the muntin grating. Therewith, the muntin bars or the muntin gratings are fixed to the spacer frame by means of screws, nails or fixing clamps. Both the movement of tie-bar bodies and that one of the sliding blocks and fixing devices and also that one of the screwing apparatus and/or the pneumatically operated hammer can be conveniently controlled by a controlling unit. The movement is performed with respect to the special size and position of the respective spacer frame to be wherein said movement can be performed and controlled simultaneously or successively.

After all, it turned out to be of good use to provide the screwing apparatus or the pneumatically operated hammer as an independently working and adjustable unit comprising:

at least a device for screwing or shooting so-called SPAX® screws, i. e. self-cutting screws, a movably carried distance positioning supporting device for the muntin bar or the muntin grating to be screwed or shot, and a positioning laying-on device for said frame for the muntin bars to be able to position an end of the muntin relative to the inner surface of the spacer frame profile.

Further, the distance positioning supporting device can cooperate with a gripping jaw for fixedly gripping the muntin bar or the muntin grating in a position in which it is to be screwed or shot with respect to the spacer frame. Herein, the muntin bar or muntin grating is gripped at least during the screwing or shooting process with respect to the longitudinal direction of the tie-bar body.

Other objects and a complete understanding of the invention will be given by referring to the following description and claims of a preferred embodiment thereof, taken in conjunction with the accompanying drawings in which:

DESCRIPTION OF THE PREFERRED EMBODIMENT OF THE INVENTION

Figure 1:
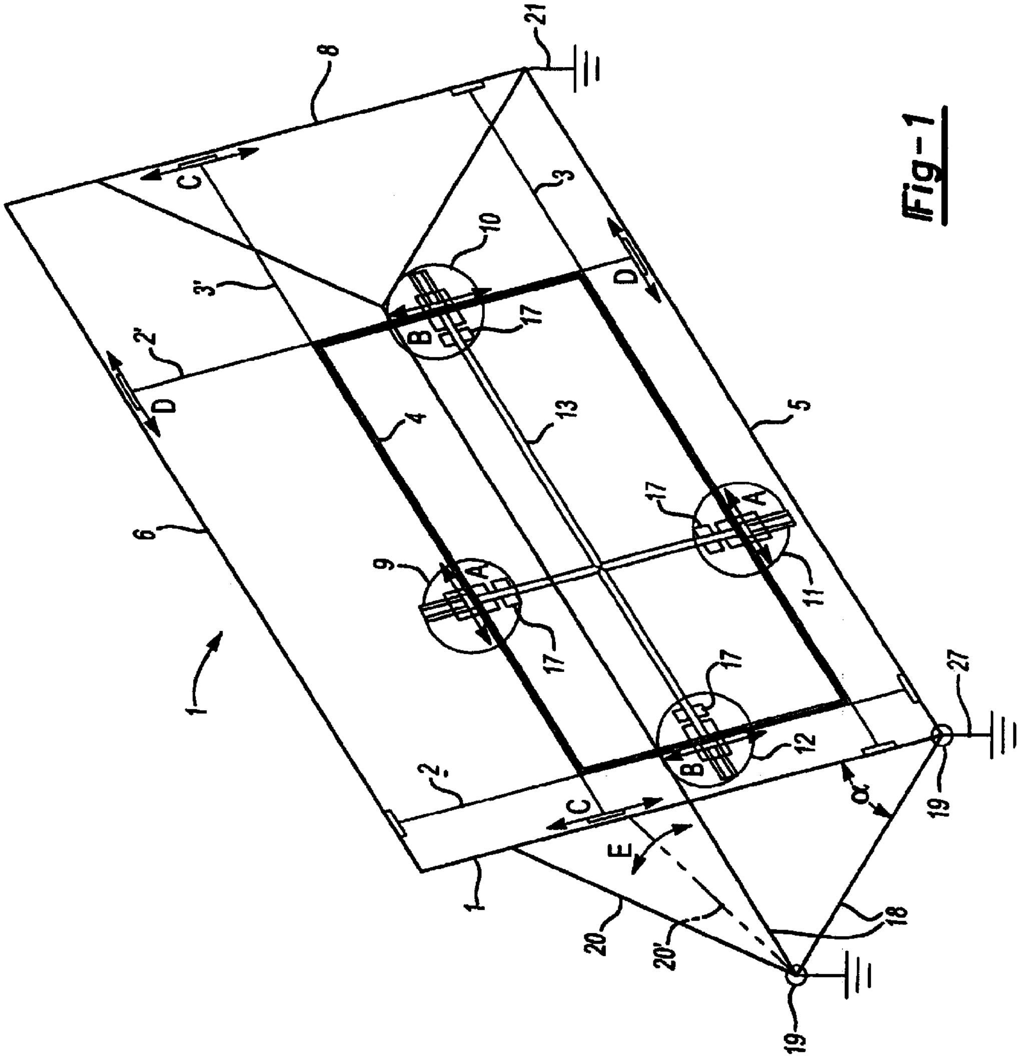
FIG. 1 is a schematically shown perspective view of the mounting device.

As shown in FIG. 1, the device for installing a muntin cross 13 into a spacer frame 4 of an insulated glass window includes a mounting frame 1 being inclined to the vertical plane according to an angle $\alpha$. The mounting frame 1 receives movably supported tie-bars 2, 2'; 3, 3' serving for fixedly holding and machining spacer frames 4 of different sizes together with respective muntin bars or a muntin cross 13 as also for holding controlled fixing and mounting devices 9, 10, 11, 12 serving for positioning and fixing the muntin bars or muntin cross within the spacer frame 4 of, for example, an insulated glass window.

Figure 2:
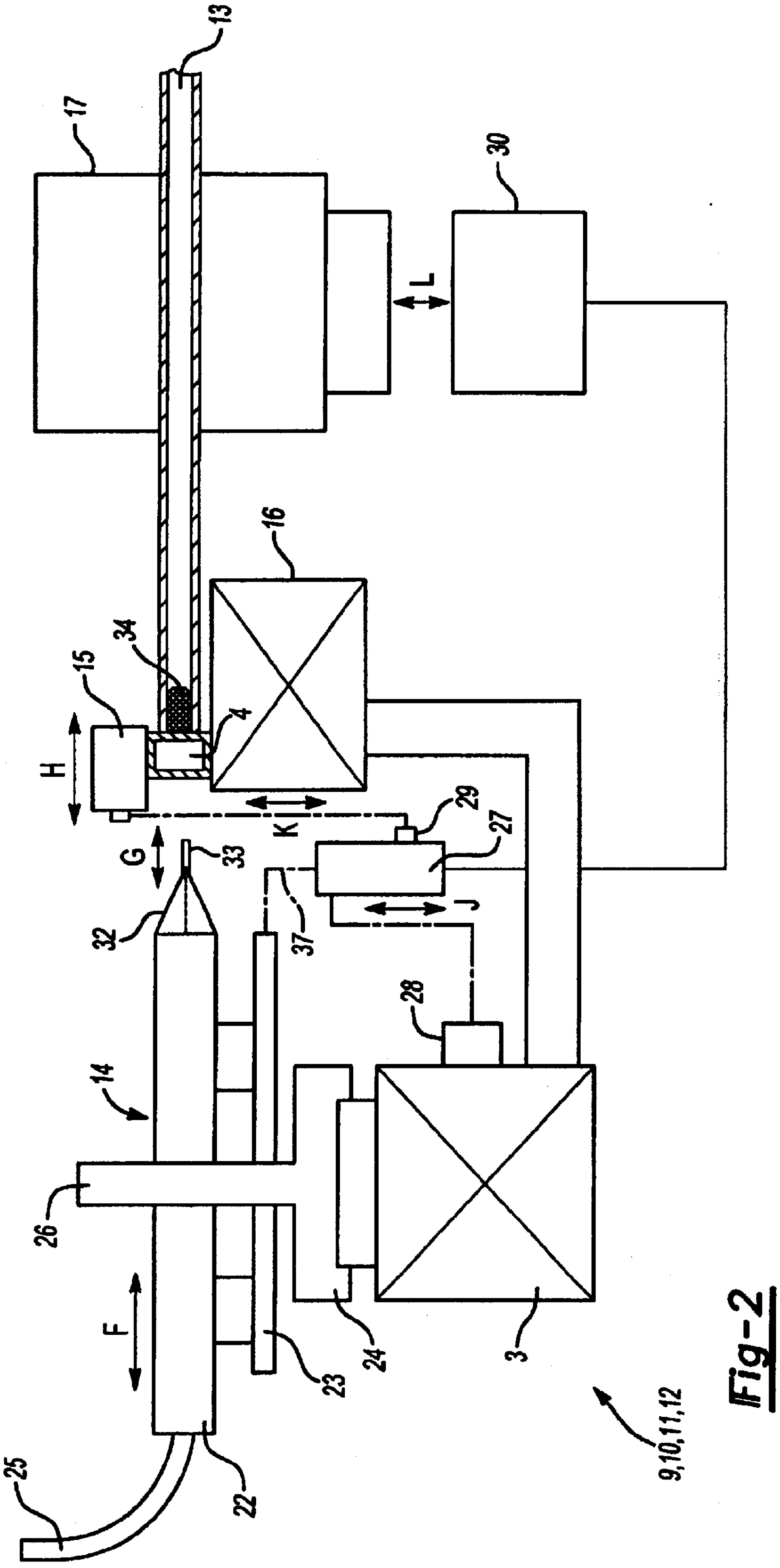
FIG. 2 is a schematic view showing a detail of the movably supported fixing device for positioning and centering the screwing apparatus with respect to the spacer frame, used in the device of FIG. 1.

Referring now to FIG. 2, it is generally to be noted that the muntin cross 13 is arranged within the hollow space of an insulated glass window that includes two panes of glass which are separated from one another by the spacer frame 4. The connection of such a muntin cross 13 is realized such that the muntin is shootingly fixed, wherein normally it is actually screwed to the inner side of the spacer frame 4. Herein, screws are screwed at predetermined positions through the outer side wall of the frame 4 from the outside thereof by, for example, the controlled fixing and mounting devices 10, 11 (discussed below). The screws thereby are passing through the hollow profile of the frame 4 and do not directly contact the muntin bar of the cross 13 but enter into the plastic plug 34 plugged into the muntin bar at the end thereof. Thus, the plug 34 is widened due to the entering action of the screw leading to the fact that the plug 34 is fixed against the inner wall of hollow profile of the muntin bar.

As schematically shown in FIG. 2 the controlled fixing and mounting devices characterized by reference numeral 9, 10, 11 and 12 are devices including: characterizes respectively devices which are a positioning laying-on device 16 for said frame 4, a gripping jaw device 17 for gripping the muntin bar or the muntin cross 13 to be installed into the spacer frame 4, a screwing device 22 adjustable device 14 adjustable both in its vertical and lateral direction, wherein the head 32 of which can be aligned relative to the outside of the spacer frame 4 gripped and held down for screwing the muntin bar or the muntin cross 13 to the inner side of the frame 4; and a distance positioning supporting and holding device 15 movably supported onto or above the spacer frame 4 as shown by arrow H, wherein the spacer frame 4 is gripped between the distance positioning supporting and holding device 15 and the positioning laying-on device 16 for said frame connected with one of the tie-bars 3, 3'.

A gripping jaw device 17 gripping the muntin cross 13 is used to ensure an exact positioning and gripping of the muntin bar or the muntin cross 13, which gripping jaw device is held movably in the directions, shown by arrow L, by a hydraulic or pneumatic plunger 30. The plunger 30 is connected to a claw unit 27, which in turn comprises a sensor pin 29 being movable relative to the distance positioning supporting and holding device 15, so that the upper surface of the spacer frame 4 can be scanned. On the other hand, the claw unit 27 can be moved relative to the tie-bars 3, 3' of the mounting frame 1 and a sensor pin 28 fixed thereto. Possible moving directions of the claw unit 27 are shown by arrows K and J. For the purpose of centering, the claw unit 27 is connected to the screwing apparatus 22 shown by dotted line 31 in FIG. 2.

The controlled fixing and mounting devices 9, 10, 11, 12 being identical or especially identically structured cooperate with the distancing laying-on devices 16 of the mounting frame 1 which are fixedly connected to the tie-bars 3, 3' belonging to the mounting frame 1 and are movably supported thereon, as shown in FIG. 2. The positioning laying-on devices 16 are carrying a spacer frame 4 of an insulated glass window still to be manufactured, into which spacer frame a muntin cross 13 is to be fixed at the inner side thereof.

Fixing of the spacer frame to the muntin cross 13 is realized by screwing apparatuses 22 being part of the controlled fixing and mounting devices 9, 10, 11, 12 which are adjustably supported with respect to their vertical and lateral directions, respectively, by being mounted onto a bearing block 24 which in turn can be moved along the longitudinal direction of the tie-bars of the mounting frame. Thus, these units including a head 32 can be aligned relatively to the outside of the spacer frame 4 gripped and held down, so that the muntin bar of the muntin cross 13 can be screwed to said frame.

As for performing the above process, the screwing apparatus 22 is connected to a guiding rail 26 by being movably supported to a plate 23. The plate 23 can be vertically adjusted along the longitudinal direction of the guiding rail, wherein the screwing apparatus is supported such that it can be moved both in the longitudinal and transversal direction. Moving the screwing apparatus in the longitudinal direction is denoted by arrow F corresponding to the movement of the screw 33 shown at the head 32 and denoted by arrow G.

As can be seen in FIG. 1, the mounting frame 1 comprises two parallel, especially horizontally arranged fixed frame bodies 5, 6 and two parallel side bodies 7, 8 arranged rectangularly to the two frame bodies and connecting them together. The tie-bars 2, 2'; 3, 3' in turn comprise two upstanding tie-bar bodies 2, 2' which are supported by the frame bodies 5, 6, and two transverse tie-bar bodies 3, 3' being rectangular to the upstanding tie-bar bodies and being supported by the side bodies 7, 8. At least one of the upstanding tie-bar bodies 2, 2' is movably supported by the horizontal frame bodies 5, 6 and at least one of the transverse tie-bar bodies 3, 3' is movably supported by the side bodies 7, 8 arranged vertically or inclined to the vertical plane including the angle α. In this way, by adjusting the respective tie-bar bodies, it is possible to handle spacer frames 4 having an arbitrary frame size and to adjust and position the devices 9, 10, 11, 12 at their respective sites of the spacer frame concerning the fixing points of the muntin cross 13 in accordance with the directions denoted by arrows A and B.

As can be seen, the mounting frame 1 is arranged on a basis frame 18, provided with at least one frame stretcher 20, 20' pivotally connected to the basis frame, so that the mounting frame can be adjusted with respect to its angle of inclination α. The basis frame comprises footings 21 which can be adjusted to arrange the basis frame in a desired level. As this is denoted by arrow E, the mounting frame 1 can be pivoted in the vertical plane above the horizontal plane by articulation joints 19 provided at the junctions of the mounting frame with the basis frame.

The fixing and mounting devices 9, 10, 11, 12 which are so-called slidingly supported clamp devices are program-controlled and work automatically, wherein each single movement is triggered and guided by intermittently actuated motors and pilot motors or other pneumatically or electrically operated devices which are known in the art. This is carried out such that all movements of the screwing apparatus 22, the distance positioning supporting device 15, the gripping jaw device 17, the claw unit 27 as well as the positioning laying-on device 16 for the frame 4 connected to the tie-bars of the mounting frame 1 are each networked with one another. Thus it is guaranteed that the spacer frame 4 and the muntin bars or the muntin grating 13 to be installed therein can be arranged into a desired screwing position before carrying out the screwing process, wherein these elements can be fixedly held until this process is terminated. All the movements of the several devices, i.e. the fixing and mounting devices 9, 10, 11, 12 can be automatically carried out simultaneously or successively according the chosen treatment program.

With respect to the second main aspect of the invention, a mounting method is provided in correspondence to the above device for installing muntin bars or muntin gratings into a frame, i.e. a spacer frame of an insulated glass window. According to the invention this method comprises the steps of:

positioning a spacer frame of desired size onto the tie-bars of the mounting frame;

fixing a plastic terminal plug within the ends of the muntin bars, i.e. the muntin grating ends, respectively, so that an end flange of the plugs abuts against the inner side of the spacer frame; and fixing said plugs, i.e. the muntins or the muntin cross or grating fixed thereto at determined positions to the spacer frame profile.

The last step is accomplished by screwing or shooting screws or shooting clamps through the hollow profile of the spacer frame from the outside thereof, respectively, which screws or shooting clamps are provided by a screwing apparatus or a shooting device being movably supported relative to the spacer frame.

It is further provided that the screwing apparatus or the shooting device 14 is program-controlled and is thus automatically moved into its correct position relative to the spacer frame, wherein the muntins, muntin bars or the muntin cross are centered and fixed at the spacer frame by gripping jaw devices. These gripping jaw devices were adjusted according to the directions shown by arrow L, as this is to be seen by number 30 in FIG. 2, by hydraulic or pneumatic plungers. The plungers are functionally connected with claw units 27 which scan the surface of the spacer frame 4 carried by its positioning laying-on device 16 in relation to its position to the screwing apparatus or the shooting device 14. Since each scanning movement of a claw unit is coordinated with the movement of the tie-bars, onto which the screwing apparatus or the shooting device is arranged, a precise finding of the working site at the spacer frame is ensured. Further, using an automatically operated screw-providing unit, as characterized by the curved tube 25, in FIG. 2 it is ensured that in fact a screw 33 is positioned at the head of the screwing apparatus 22 when starting the screwing action.

By using a precise guiding system including an electronic scanning system, the positions of the single parts are continuously controlled and compared with one another, so that a possibly misalignment is immediately corrected. By employing special torque clutches and electronic sensors both the screwing actions and the screwing depth are controlled, wherein faulty screws are automatically recognized and separated. In this context, magnetic tape systems are employed which guarantee for a required reproduction precision in the range of 1/10 mm and which are controlled by the executive program.

As for the essential advantages of the device and the method according to the invention all errors created by human influence are eliminated leading to a remarkable reduction in complaint costs as also to a reduction of the mounting duration of previously two minutes in average up to now 15 to 20 seconds per muntin grating.

Further, due to the provision of screwing junctions the stability of the system is essentially improved leading to relevant benefits with respect to handling of the spacer frames and the imperviousness of them. Still further, the almost vertical working plane is adapted to the manufacturing process of insulated glass windows. In this respect, the space required for such a mounting device is drastically reduced, wherein ergonomically benefits are involved which exclude previously known healthy impairments of working people.

What is claimed is:

1. A device for installing a muntin into a spacer frame comprising:

a mounting frame operable to be inclined with respect to a vertical plane and including two parallel, horizontally arranged fixed frame bodies and two parallel side bodies arranged perpendicular to the two frame bodies and connecting the fixed frame bodies;

a device for positioning a muntin within a spacer frame, the device including tie-bars and an apparatus for arranging and fixing the muntin in the spacer frame, the tie-bars being movably supported by the mounting frame and including two upstanding tie-bar bodies and two transverse tie-bar bodies, the upstanding tie-bar bodies being supported by the frame bodies and the two transverse tie-bar bodies being positioned perpendicular to the upstanding tie-bar bodies and supported by the side bodies.

2. A device according to claim 1, wherein the mounting frame is inclined between 0 and 90 degrees with respect to a vertical plane.

3. A device according to claim 1, wherein at least one of the upstanding tie-bar bodies is movably supported by the mounting frame and at least one of the transverse tie-bar bodies is movably supported by the mounting frame.

4. A device according to claim 1, further comprising a basis frame onto which the mounting frame is arranged, wherein the basis frame is provided with at least one frame stretcher pivotally connected to the mounting frame so that the mounting frame can be adjusted with respect to the vertical plane.

5. A device according to claim 4, wherein the basis frame comprises footings.

6. A device according to claim 5, wherein the footings are adjustable with respect to their length.

7. A device according to claim 1, wherein the two transverse tie-bar bodies form an upper and a lower tie-bar, respectively, and are arranged above and beneath the upstanding tie-bar bodies that are positioned perpendicular thereto and that form a left-hand side and a right-hand side tie-bar, respectively.

8. A device according to claim 1, wherein the tie-bar bodies comprise a movably supported fixing device for enabling the spacer frames having different sizes to be positioned and centered along with the respective muntin.

9. A device according to claim 1, wherein the apparatus for arranging and fixing the muntin is positioned on at least one of the tie-bar bodies.

10. A device according to claim 9, wherein the apparatus for arranging and fixing the muntin is provided as an independently working and adjustable unit comprising:

a device for driving a fastener;

a movably carried distance positioning supporting device for the muntin to be fastened; and a positioning laying-on device for the spacer frame to be able to preposition an end of the muntin relative to an inner surface of the spacer frame.

11. The device according to claim 10, wherein the device for driving a fastener comprises a screwing device.

12. The device according to claim 10, wherein the device for driving a fastener comprises a shooting device.

13. The device according to claim 12, wherein the shooting device is a pneumatic hammer.

14. A device according to claim 10, wherein the distance positioning supporting device comprises a gripping jaw device for fixedly gripping the muntin in a position in which the muntin is to be fastened with respect to the spacer frame, the gripping jaw device being adapted to grip the muntin during a fastening process.

15. A device according to claim 10, wherein the distance positioning supporting device functions to center the muntin relative to the fastening device.

16. A device according to claim 1, wherein the apparatus for arranging and fixing the muntin is positioned on at least one of the tie-bar bodies and the apparatus comprises a device for driving a fastener, the device for driving a fastener thereby being movably supported relative to the spacer frame and the muntin.

17. A device according to claim 16, further comprising a controlling unit, the controlling unit being operable to automatically move the tie-bar bodies and the apparatus for arranging and fixing the muntin with respect to the size of the spacer frame and the position of the respective muntin to be installed into said frame, wherein said movements can be performed simultaneously or successively.

18. A device for installing a muntin into a spacer frame comprising:

a mounting frame that is operable to be inclined with respect to a vertical plane;

a basis frame onto which the mounting frame is arranged having a footing and a frame stretcher, the footing being adjustable with respect to its length, the frame stretcher being pivotally connected to the mounting frame so that the mounting frame is adjustable with respect to a vertical plane; and a device for positioning a muntin within a spacer frame, the device including tie-bars and an apparatus for arranging and fixing the muntin in the spacer frame, the tie-bars being movably supported on the mounting frame for use in fixing and machining spacer frames of different sizes together with the muntin.

19. A device according to claim 18, wherein the mounting frame is inclined between 0 and 90 degrees with respect to a vertical plane.

20. A device according to claim 18, wherein the mounting frame includes two parallel, horizontally arranged fixed frame bodies and two parallel side bodies arranged perpendicular to the two frame bodies and connecting fixed frame bodies and the tie-bars include two upstanding tie-bar bodies and two transverse tie-bar bodies, the two upstanding tie-bar bodies being supported by the frame bodies and the two transverse tie-bar bodies being positioned perpendicular to the upstanding tie-bar bodies and supported by the side bodies.

21. A device according to claim 20, wherein at least one of the upstanding tie-bar bodies is movably supported by the mounting frame and at least one of the transverse tie-bar bodies is movably supported by the mounting frame.

22. A device according to claim 20, wherein the two transverse tie-bar bodies form an upper and a lower tie-bar, respectively, and are arranged above or beneath said upstanding tie-bar bodies that are positioned perpendicular thereto and that form a left-hand side and a right-hand side tie-bar, respectively.

23. A device according to claim 18, wherein the tie-bar bodies comprise a movably supported fixing device for enabling the spacer frames having different sizes to be positioned and centered along with the respective muntin.

24. A device according to claim 18, wherein the apparatus for arranging and fixing the muntin is positioned on at least one of the tie-bar bodies.

25. A device according to claim 18, wherein the apparatus for arranging and fixing the muntin is positioned on at least one of the tie-bar bodies and the apparatus comprises a device for driving a fastener, the device for driving a fastener thereby being movably supported relative to the spacer frame and the muntin.

26. A device according to claim 18, further comprising a controlling unit, the controlling unit being operable to automatically move the tie-bar bodies and the apparatus for arranging and fixing the muntin with respect to the size of the spacer frame and the position of the respective muntin to be installed into said frame, wherein said movements can be performed simultaneously or successively.

27. A device according to claim 18, wherein the apparatus for arranging and fixing the muntin is provided as an independently working and adjustable unit comprising:

a device for driving a fastener;

a movably carried distance positioning supporting device for the muntin to be fastened; and a positioning laying-on device for the spacer frame to be able to preposition an end of the muntin relative to an inner surface of the spacer frame.

28. The device according to claim 27, wherein the device for driving a fastener comprises a screwing device.

29. The device according to claim 27, wherein the device for driving a fastener comprises a shooting device.

30. The device according to claim 29, wherein the shooting device is a pneumatic hammer.

31. A device according to claim 27, wherein the distance positioning supporting device comprises a gripping jaw device for fixedly gripping the muntin in a position in which the muntin is to be fastened with respect to the spacer frame, the gripping jaw device being adapted to grip the muntin during a fastening process.

32. A device according to claim 27, wherein the distance positioning supporting device functions to center the muntin relative to the fastening device.

* * * * *